US009898557B2

(12) United States Patent
Sarao et al.

(10) Patent No.: US 9,898,557 B2
(45) Date of Patent: Feb. 20, 2018

(54) METHOD AND SYSTEM FOR GENERATING BUILDING PLANS USING SLICES

(71) Applicant: Aditazz, Inc., Brisbane, CA (US)

(72) Inventors: Richard L. Sarao, San Francisco, CA (US); Scott Ewart, Berkeley, CA (US)

(73) Assignee: ADITAZZ, INC., Brisbane, CA (US)

( * ) Notice: Subject to any disclaimer, the term of this patent is extended or adjusted under 35 U.S.C. 154(b) by 49 days.

(21) Appl. No.: 14/634,611

(22) Filed: Feb. 27, 2015

(65) Prior Publication Data

US 2016/0350444 A1    Dec. 1, 2016

(51) Int. Cl.
*G06F 17/50*    (2006.01)

(52) U.S. Cl.
CPC ...... *G06F 17/5004* (2013.01); *G06F 2217/74* (2013.01)

(58) Field of Classification Search
USPC .............. 703/2, 5; 705/29; 52/41.4; 348/169
See application file for complete search history.

(56) References Cited

U.S. PATENT DOCUMENTS

| 7,003,136 B1* | 2/2006 | Harville ............ G06K 9/00201 |
| | | 348/169 |
| 2010/0198563 A1 | 8/2010 | Plewe |
| 2011/0071805 A1 | 3/2011 | Pendyala et al. |
| 2011/0181597 A1* | 7/2011 | Cardno ................. G06Q 40/04 |
| | | 345/440 |
| 2012/0053986 A1* | 3/2012 | Cardno ............. G06Q 30/0201 |
| | | 705/7.29 |
| 2012/0078685 A1 | 3/2012 | Krebs et al. |
| 2014/0095122 A1 | 4/2014 | Appleman et al. |
| 2014/0304033 A1* | 10/2014 | Cardno ............. G06Q 30/0201 |
| | | 705/7.29 |
| 2015/0135634 A1* | 5/2015 | Hoie ....................... E04C 2/205 |
| | | 52/741.4 |

OTHER PUBLICATIONS

International Search Report & Written Opinion, PCT/US2016/020115, Apr. 29, 2016.

* cited by examiner

*Primary Examiner* — Thai Pan

(57) ABSTRACT

A non-transitory computer-readable storage medium is disclosed. In an embodiment, the non-transitory computer-readable storage medium includes instructions that, when executed by a computer, cause the computer to perform steps involving receiving parameters, selecting pre-configured slices from a library of slices that satisfy the parameters, and placing the selected slices to generate a configuration variant in accordance with slice placement logic.

19 Claims, 17 Drawing Sheets

Set PatternName To Kink at end
Kink at end Start
    Set FloorName to TypicalFloor
        Build TypicalFloor (5) //builds 5 instances of TypicalFloor
            Place (1) 2bay_6primary_rooms_kink_circ_vert at 0,0 //is fixed
            Place (1) fullbay_4primary_rooms_fire90 at 60,30 //is fixed
            Place (3) fullbay_4primary_rooms at 90,30 //software determines 3 slices are needed
            Place (1) halfbay_2primary_rooms_fire90 at 210,30
        Stack TypicalFloor //stacks the 5 built instances of TypicalFloor
Kink at end Stop

FIG. 8B

METHOD AND SYSTEM FOR GENERATING BUILDING PLANS USING SLICES

BACKGROUND

Designing a building plan for repetitive spaces can be tedious and complicated. For example, when designing a plan for rooms such as hotel rooms, offices, or exam rooms, a number of desired rooms is often specified and the task of designing a building to accommodate the specified number of rooms is left up to an architect. Alternatively, a building plan can be automatically generated by a building plan generator system using pre-defined parameters. However, because the process of designing a building plan is tedious and complicated, the automated generation of a building plan is often a time-consuming and resource intensive task.

SUMMARY

In an embodiment, a non-transitory computer-readable storage medium is disclosed. In the embodiment, the non-transitory computer-readable storage medium comprises instructions that, when executed by a computer, cause the computer to perform steps involving receiving parameters, selecting pre-configured slices from a library of slices that satisfy the parameters, and placing the selected slices to generate a configuration variant in accordance with slice placement logic.

In a second embodiment, a method for generating a building plan is disclosed. In the embodiment, the method involves receiving parameters, selecting pre-configured slices from a library of slices that satisfy the parameters, and placing the selected slices to generate a configuration variant in accordance with slice placement logic.

In a third embodiment, a system for generating a building plan is disclosed. In the embodiment, the system includes a rules module including slice placement logic, a library of slices including pre-configured slices, a generation module configured to receive parameters, select pre-configured slices that satisfy the parameters from the library of slices, and place the selected pre-configured slices to generate a configuration variant, and storage for the generated configuration variant in accordance with the slice placement logic.

Other aspects and advantages of embodiments of the present invention will become apparent from the following detailed description taken in conjunction with the accompanying drawings.

BRIEF DESCRIPTION OF THE DRAWINGS

FIG. 8B is an example of pseudo-code for generating a building plan using slices from the slices library.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
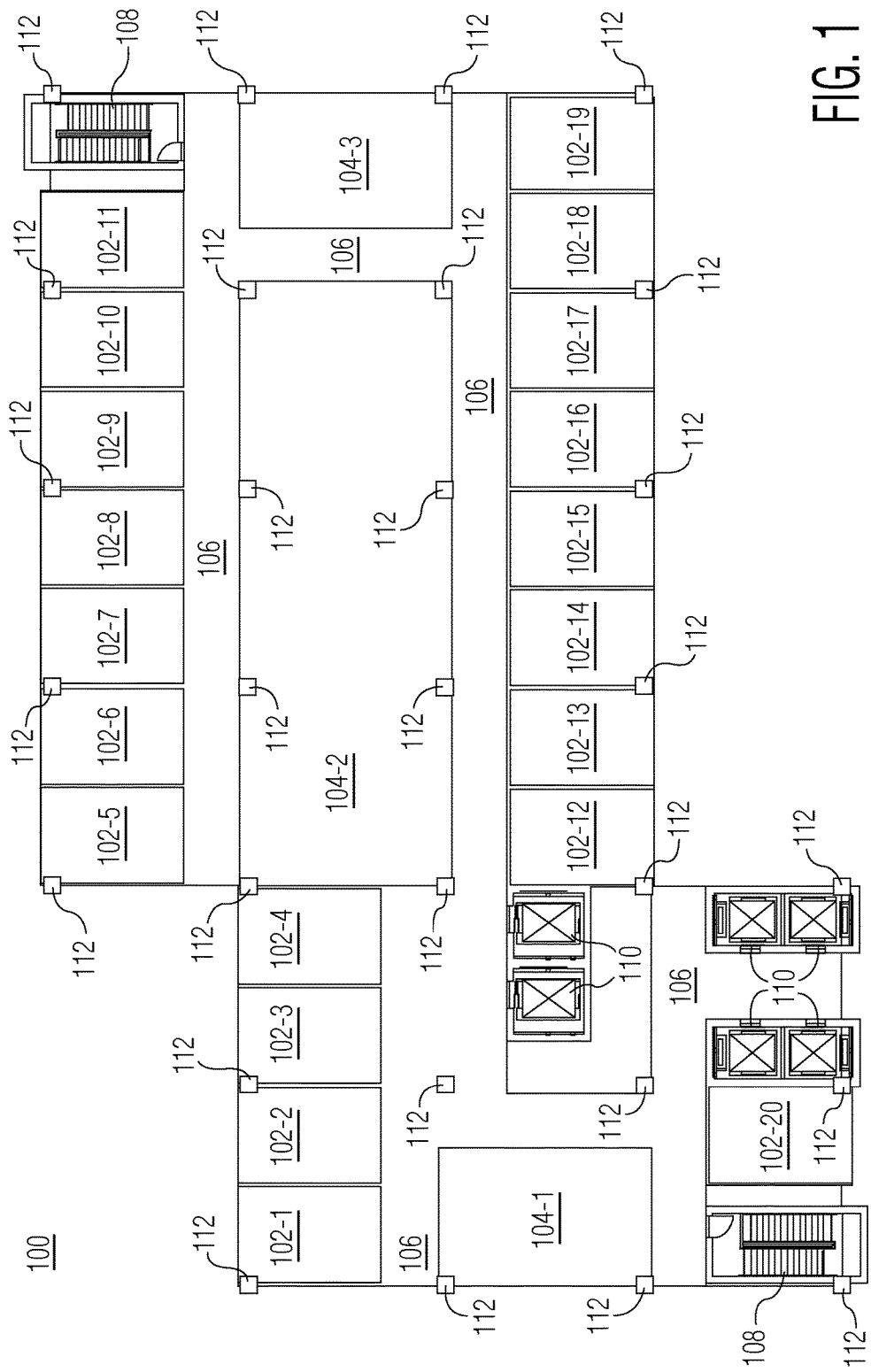
FIG. 1 is an illustration of a floor of a building plan.

As stated above, designing a building plan for repetitive spaces can be tedious and complicated. For example, FIG. 1 is an illustration of a floor plan 100 of a building plan for a hospital. The floor plan includes primary rooms 102-2-102-20, support areas 104-1-104-3, circulation elements (including hallways 106, stairways 108, and elevators 110), and a structural grid (including support columns 112 and floor slabs (not shown)). In an embodiment, a primary room is a room in a building that is repeated multiple times in a pattern. Patient rooms in a hospital or guest rooms in a hotel that can be designed identically and repeated in a pattern are examples of primary rooms. In the example of FIG. 1, the floor plan includes twenty primary rooms (e.g., patient rooms) positioned near administrative areas and connected to a hallway that leads to several stairways and elevators. In order to generate the floor plan of FIG. 1, consideration is given to a multitude of factors such as the number of primary rooms to include, how those rooms connect to hallways, how the structure of the building limits the placement of rooms and hallways, what the perimeter of the building will look like, and/or how the exit egress system will run through the building. The multitude of factors is considered at each step of the generation process. For example, when adding room 102-7 to the floor plan, a multitude of factors will have to be considered, such as how the room will be able to connect to the hallway, whether the support structure of the building will interfere with the placement of the room, how the room will impact the perimeter of the building, and how the exit egress system will reach the room.

The multitude of factors that must be considered at each step can cause the generation process to be lengthy, slow, and repetitive. Automation of the generation process in a computer can help to reduce the time needed by the generation process because a computer can perform repetitive considerations and calculations much faster than is possible by a human. However, the generation process still involves many repetitive considerations and calculations, which can place a high demand on processing power and increase the time needed to generate floor plans and building plans. While additional processing power would accelerate the generation process, additional processing power may only allow for linear growth. For example, a computer with twice as much processing power typically will only automate the generation process, at most, twice as fast.

Alternatively, in accordance with an embodiment of the invention, automation of a building plan generation process can be accelerated by using a library of pre-configured slices and predefined placement logic (rules). In an embodiment, a non-transitory computer-readable storage medium is disclosed. In the embodiment, the non-transitory computer-readable storage medium stores instructions that, when executed by a computer, cause the computer to perform steps involving receiving parameters, selecting pre-configured slices from a library of slices that satisfy the parameters, and placing the selected slices to generate a configuration variant in accordance with slice placement logic. Because the slices are pre-configured, many of the repetitive considerations and calculations are performed only once when the slices are pre-configured and need not be performed again. Thus, demand on processing power is reduced and the automation of the building plan generation process is accelerated.

In accordance with an embodiment of the invention, slices are pre-configured parametrically-defined rectangular cross-sections of a floor plan. In an embodiment slices are pre-configured in that they are self-contained portions that are designed, calculated, or configured (manually or automatically) prior to generating building plans. In an embodiment, each slice is pre-configured to be compatible with other slices in a library of slices such that the slices in the library are compatible for side-by-side placement to form a floor plan without, for example, considering individual factors such as how rooms will be able to connect to hallways, whether support structures of the building will interfere with the placement of the rooms, how the rooms will impact the perimeter of the building, or how the ventilation system and electrical system will reach the rooms. In an embodiment, slices in the library of slices are pre-configured in compliance with a series of rules. In an embodiment, the rules require that each slice can tessellate and that each slice includes horizontal circulation pathways, structural columns, connection edges, and exterior edges. In an embodiment, a slice can tessellate if the slice has a semi-regular shape that can be repeated in a pattern to create a shape in which repetitions of the slice do not overlap and/or without creating gaps between the slices. In an embodiment, a slice has two connection edges (i.e., edges along which another slice can be placed) and horizontal circulation pathways bisect each slice from one connection edge to the other connection edge. In addition to properties needed to satisfy the rules, slices may include vertical circulation pathways, indicators of primary room (e.g., an outline of a primary room or coloration/shading in the shape of a primary room) slots, and/or open space for non-primary room slots. Additionally, each slice may indicate the type of space (e.g., in a similar manner to indicators of primary room slots) that makes up a slice or the allocation of space within a slice (e.g., indicate which part of the slice contains a primary room, open space, circulation pathway, etc.) For example, a slice can be pre-configured with four primary rooms (e.g., patient rooms 102-5, 102-6, 102-12, and 102-13 as described with reference to FIG. 1) connected to a hallway (i.e., a horizontal or vertical circulation pathway such as the hallway 106 as described with reference to FIG. 1) that will align with a hallway in any other slice. In an embodiment, a pre-configured slice is shaped such that other slices or the same slice can be placed adjacent to the slice without overlap and/or without creating a gap. Thus, when generating the floor plan of FIG. 1, the building plan generator can select a slice having, for example, room 102-7 without considering how room 102-7 will connect to a hallway or other slices since the slice is pre-configured with room 102-7 already connected to a hallway and all slices can be placed adjacent to all other slices in the slice library.

In an embodiment, a building plan can be generated by receiving input parameters that include a slice placement pattern (e.g., a building footprint of a simple bar, a bar with a kink at an end, a bar with a kink in the middle, etc.), a target number of primary rooms in the building, a minimum number of primary rooms per floor, a maximum number of primary rooms per floor, and a step size by which the number of primary rooms per floor can be changed. The building plan generator can then select slices from a library of slices that satisfy the parameters. In an embodiment, each slice includes a structural grid that indicates the location of structural columns within a slice, an exterior skin that indicates the physical dimensions of outside walls of a slice, and circulation elements (e.g., hallways and stairs) that indicate the location of circulation elements within a slice. The building plan generator then places the selected slices, in accordance with slice placement logic, to generate a configuration variant by placing a first selected slice in the slice placement pattern and then placing subsequent selected slices adjacent to the previously placed slice such that connection edges of the selected slices abut one another (e.g., connect). In an embodiment, slice placement logic is defined by rules that control how slices are placed in a slice placement pattern. In an embodiment, the rules include logic controlling what slices can be placed first or last in a slice placement pattern and what slices can be place in between the first and last slice. For example, slice placement logic may indicate that a slice including a stair well is placed first and last in the slice placement pattern. The time required by the building plan generator to produce a floor plan is much less because design conflicts, such as room placement and structural column placement, are already resolved when pre-configuring the slices in the library of slices. Thus, the processor need only determine how the selected slices are to be placed in the slice placement pattern and time need not be spent on a multitude of calculations and considerations. Accordingly, the generation process can be accelerated and can be accelerated without adding processing power.

Figure 2:
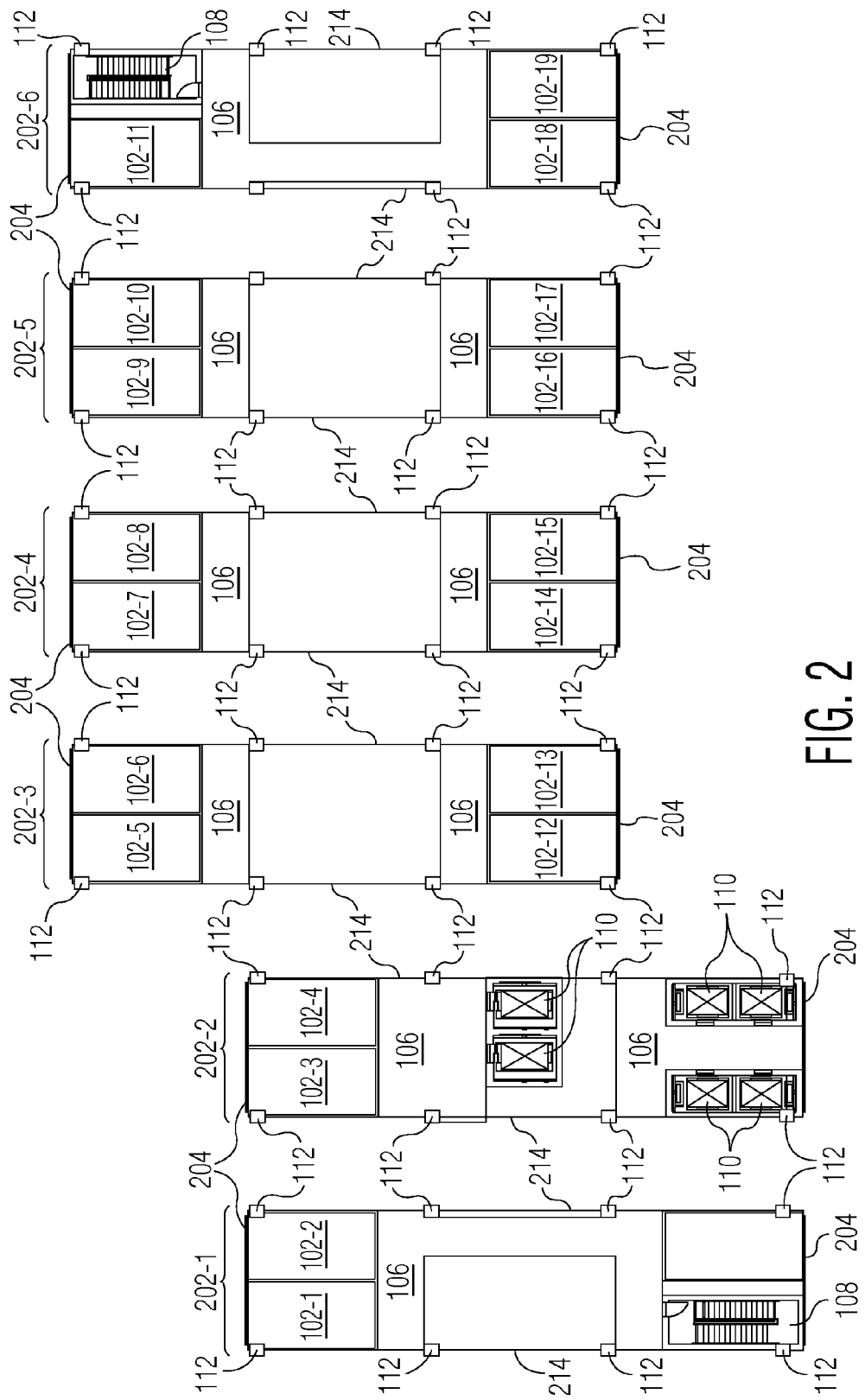
FIG. 2 is an illustration of the floor from FIG. 1 broken up into slices.

FIG. 2 is an illustration of the floor plan in FIG. 1 broken up into slices 202-1-202-6. As illustrated, each slice includes structural columns 112, as indicated by a structural grid, portions of outside walls 204 that form opposite sides of the slice, edges along which other slices can be placed 214 (referred to as "connection edges") and circulation elements such as hallways 106 and/or stairs 108 and elevators 110. In the illustration of FIG. 2, elements that span two slices (e.g., structural columns 112) are fully illustrated in each slice for illustrative simplicity. Thus, in an embodiment, elements of a slice do not overlap. In an embodiment, each slice is pre-configured using building elements (as described below with reference to FIG. 4.) For example, in FIG. 2, slice 202-1 is pre-configured as having three primary rooms 102-1, 102-2, 102-3, a hallway, a support area, and a stairway, while slice 202-2 is pre-configured as having two primary rooms, a hallway (divided, but still considered a single hallway), and three elevator bays. Thus, when slice 202-1 is placed adjacent to slice 202-2, the hallway of slice 202-1 is assured to line up with the hallway of slice 202-2 and the primary rooms and other building elements of both slices are assured to be accessible from either slice via the hallway.

Figure 3:
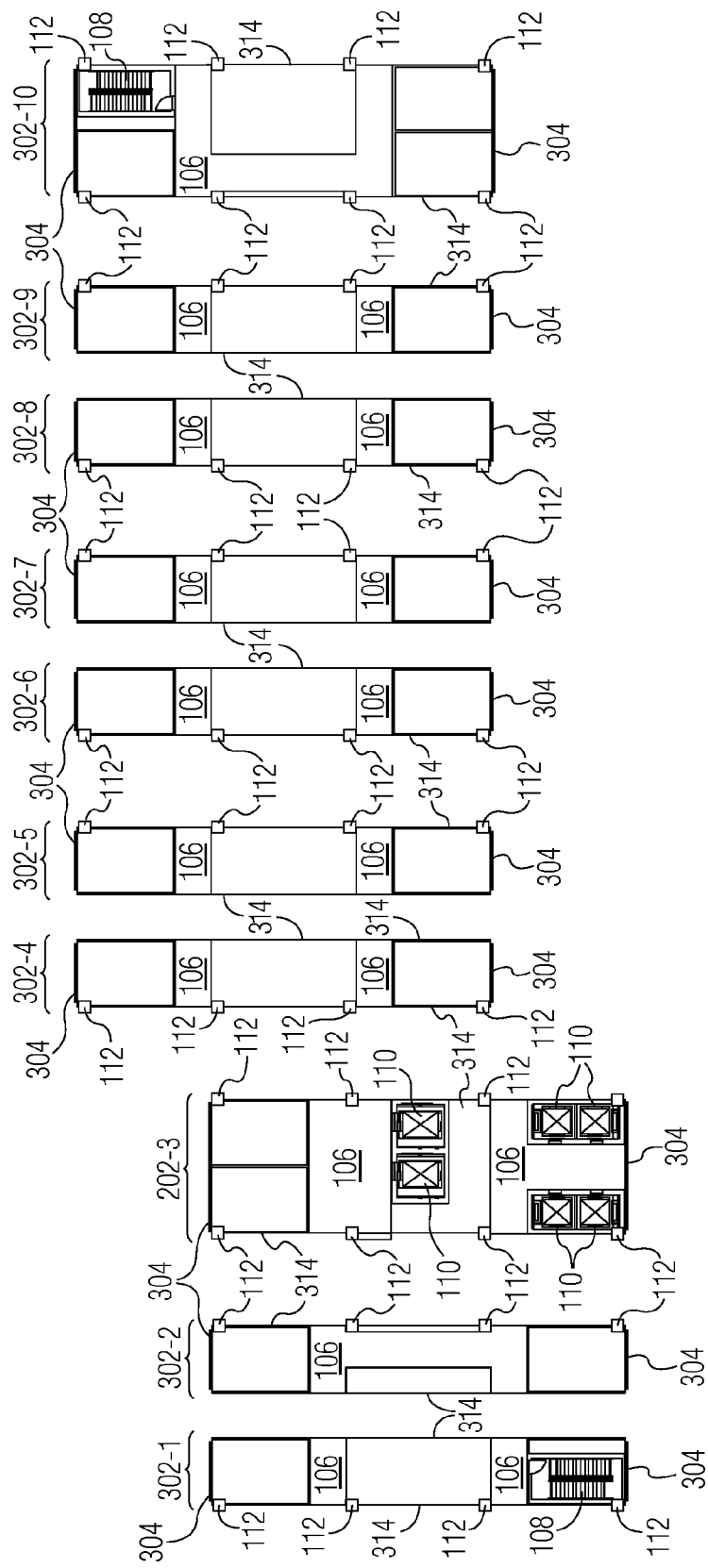
FIG. 3 is an illustration of the floor from FIG. 1 broken up into an alternate configuration of slices.

FIG. 3 is an illustration of the floor plan in FIG. 1 broken up into an alternate configuration of slices. As illustrated, each slice 302-1-302-10 includes structural columns 112, as determined by a structural grid, outside walls 304 as determined by an exterior skin, connection edges 314, and hallways 106 and/or stairs 108 and elevators 110, as determined by a circulation grid. Additionally, each slice is pre-configured using building elements (as described below with reference to FIG. 4.) The alternative configuration of the slices, as illustrated in FIG. 3, allows for greater variations when generating a building plan because fewer building elements are combined together in a single slice. Similar to the slices illustrated in FIG. 2, each slice illustrated in FIG. 3 can be placed adjacent to any other slice in FIG. 3 by placing the slices in accordance with a slice placement pattern. Thus, despite the greater possibility for variations when generating the building plan, floor plans generated using the slices assuredly remain functional (e.g., hallways in two slices abut one another and rooms are accessible via the hallway).

Figure 4:
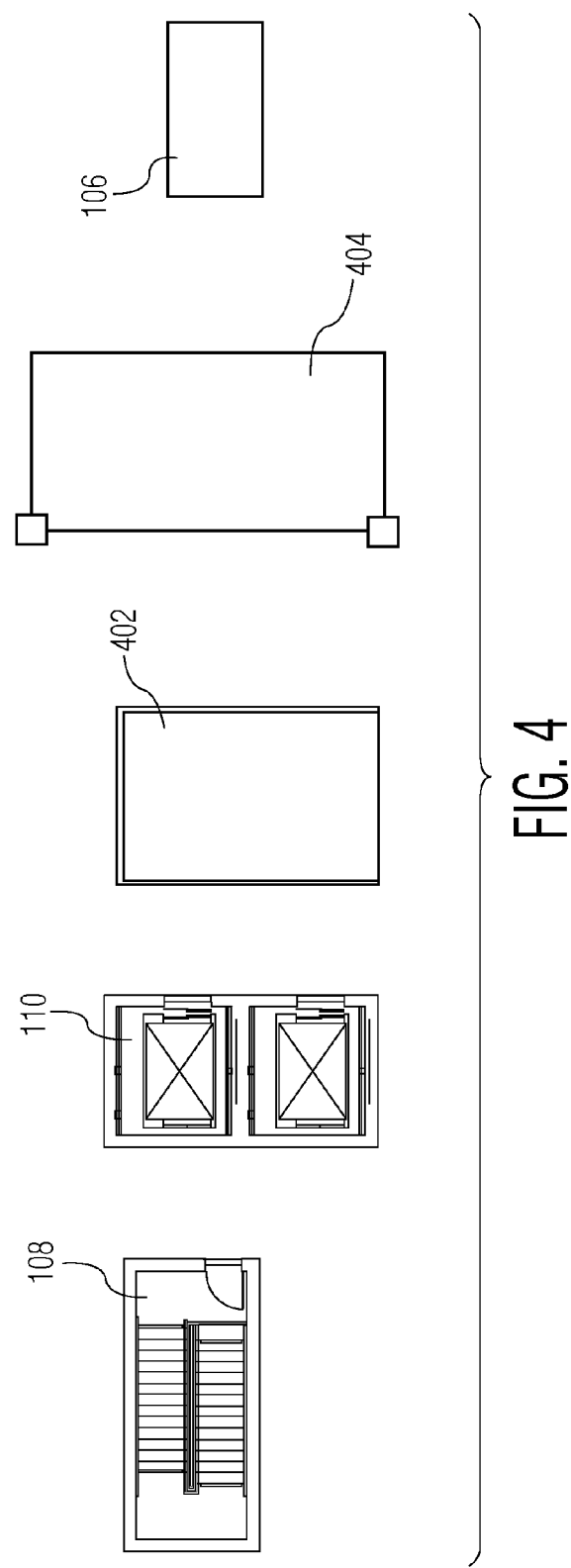
FIG. 4 depicts example building elements that can be used to pre-configure a slice.

As described with reference to FIGS. 2 and 3, slices are pre-configured using building elements. FIG. 4 depicts example building elements that can be used to pre-configure a slice. FIG. 4 includes a stairway element 108, an elevator element 110, a primary room element 402, a support area element 404, and a hallway element 106. In other embodiments, not all of the elements shown are used to pre-configure a slice and additional elements (not shown) can also be used to pre-configure a slice. In an embodiment, a slice can be pre-configured using building elements by graphically placing building elements within a slice. By pre-configuring a slice using building elements, the building plan generator can determine if a slice satisfies input parameters. For example, if a building plan is pre-configured with four primary room elements, then the slice may be selected when an input parameter would be satisfied by a slice having four primary room elements. Thus, by pre-configuring slices using building elements and using slices to generate building plans, the building plan generator can place slices that satisfy input parameters in accordance with a slice placement pattern to form a floor plan for floors of a building plan. In an embodiment, slices, floor plans, and building plans are architectural plans or graphical illustrations as opposed to physical constructs. For example, a slice is a graphical illustration of a cross-section of a floor plan. The graphical illustrations can be used for evaluation and/or as a blueprint or guide for construction or further detailed planning of the floor plan.

Figure 5A:
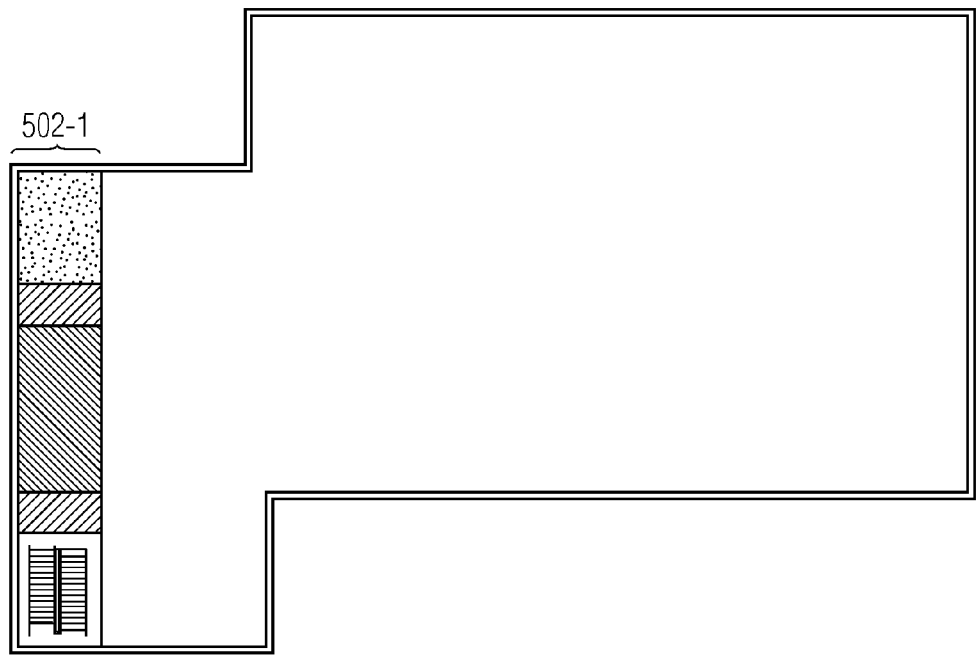
FIGS. 5A-5D illustrate slices being placed to form a floor plan.
Figure 5B:
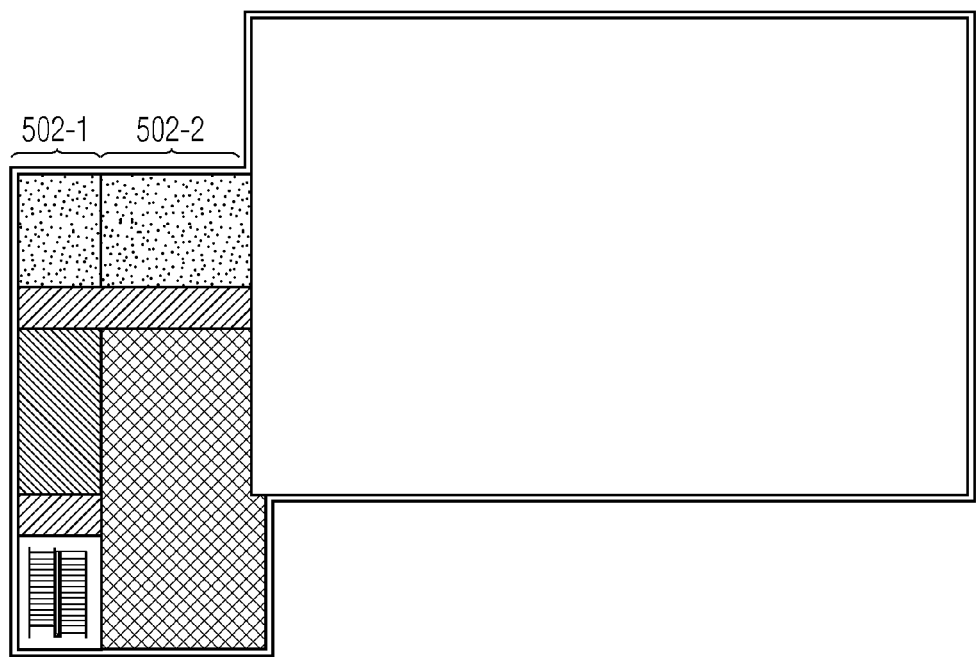
Figure 5C:
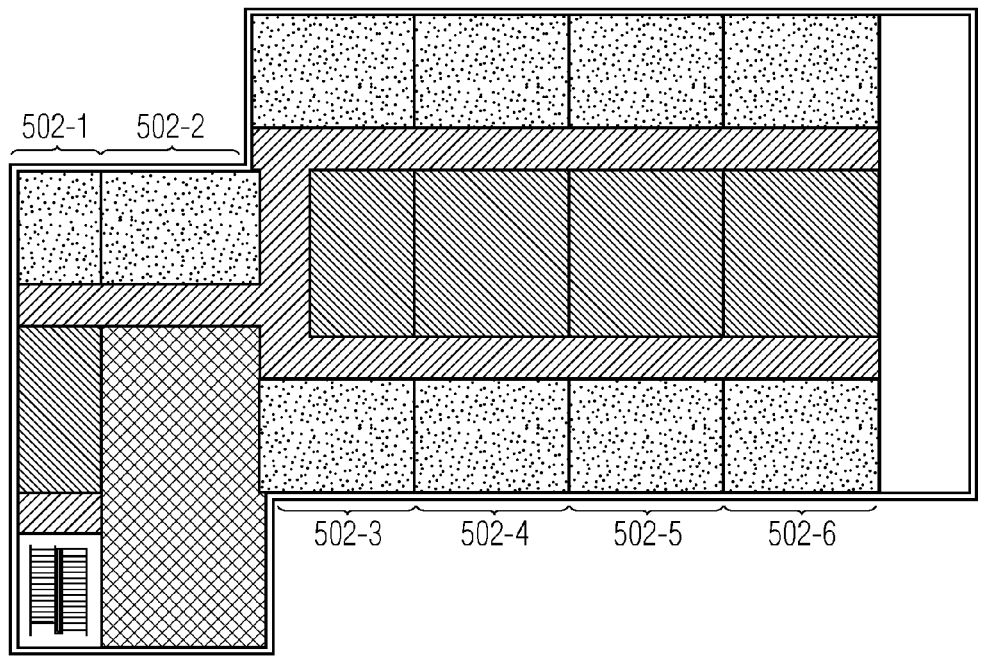
Figure 5D:
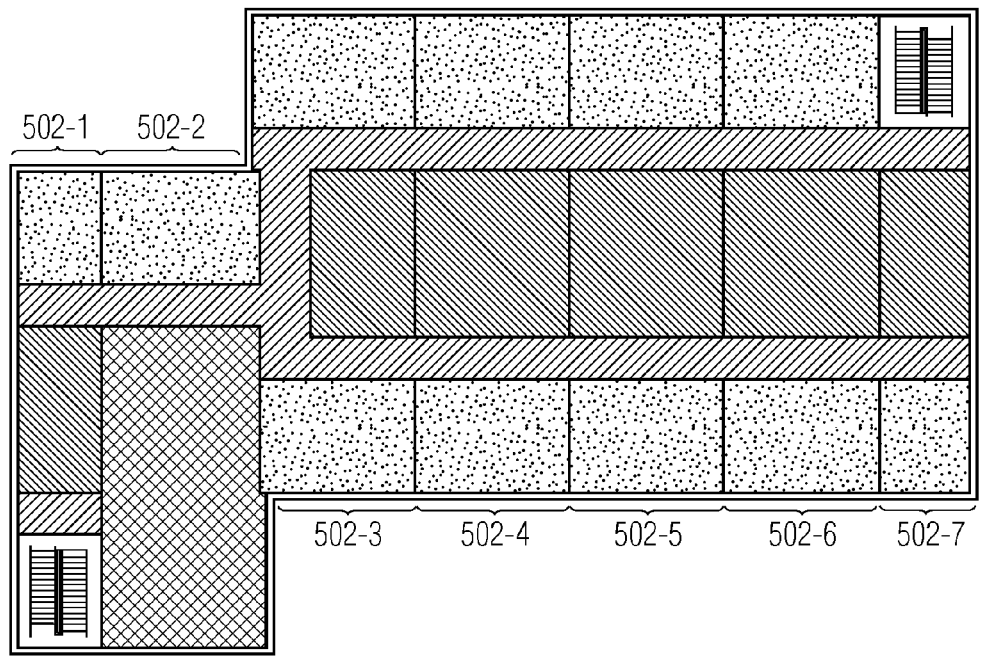
Figure 6A:
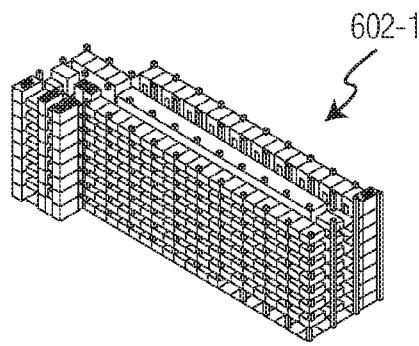
FIGS. 6A-6L illustrate several building plans generated using slices.
Figure 6B:
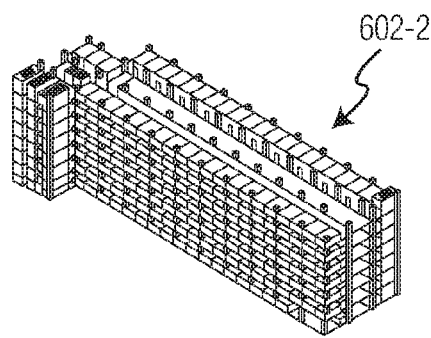
Figure 6C:
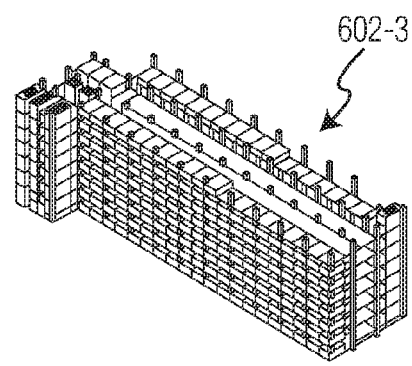
Figure 6D:
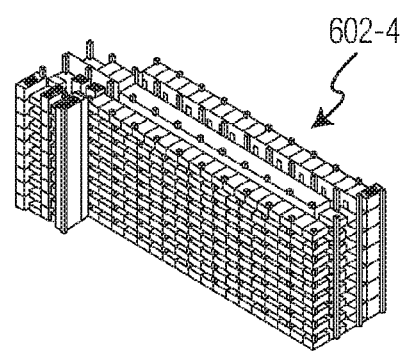
Figure 6E:
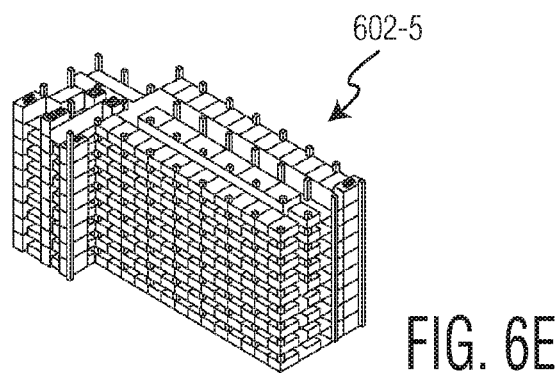
Figure 6F:
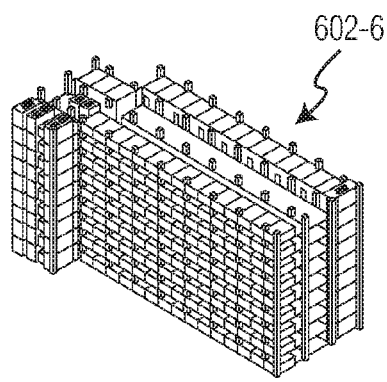
Figure 6G:
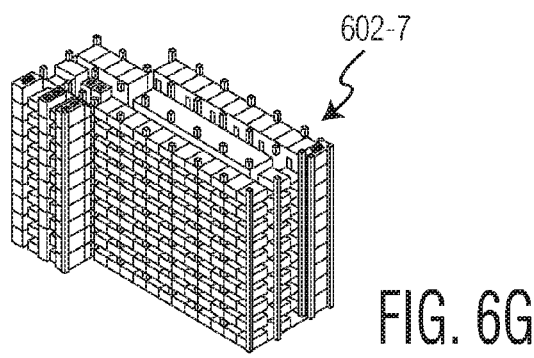
Figure 6H:
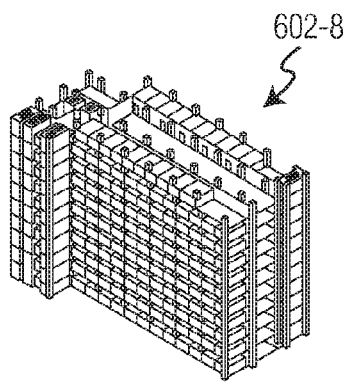
Figure 6I:
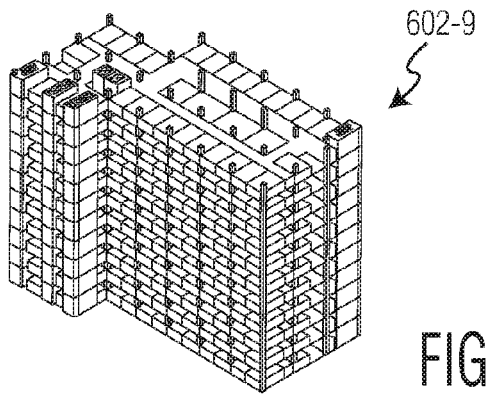
Figure 6J:
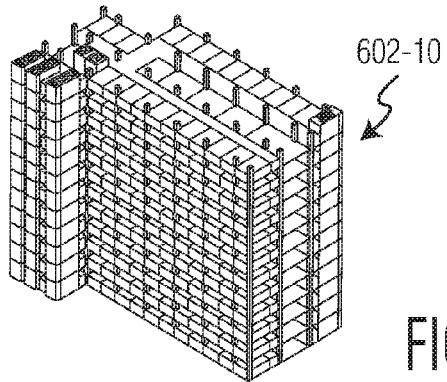
Figure 6K:
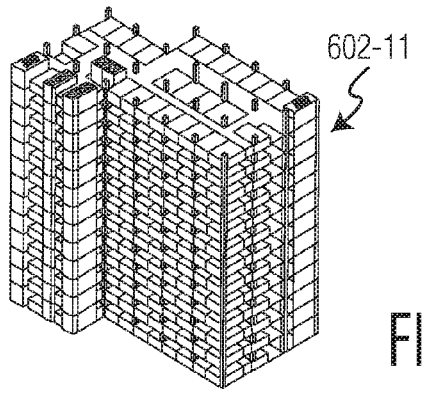
Figure 6L:
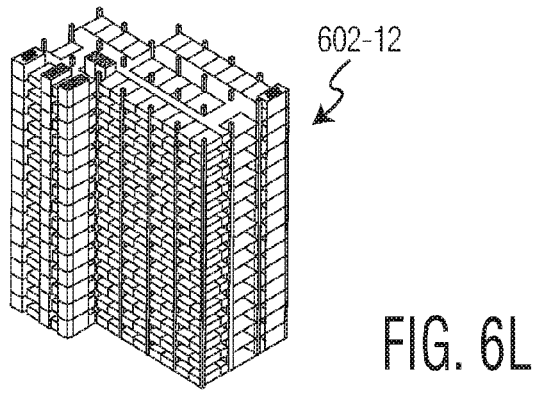

FIGS. 5A-5D illustrate slices being placed together to form a floor plan. As illustrated in FIGS. 5A-5D, slices are placed side-by-side to form a floor plan such that connection edges of the slices abut one another according to a slice placement pattern having a kink at an end (i.e., the left two slices are vertically offset from the rest of the slices). In an embodiment, each slices is pre-configured such that the slices can be placed in any order. Referring to FIG. 5A, a first slice 502-1 is placed at the left-most part of the floor plan and includes one primary room element, a hallway element, a support area element, a stairway element, structural columns, and an exterior skin. With reference to FIG. 5B, a second slice 502-2 is placed adjacent to the right side of the first slice and has two patient room elements, a hallway element, an elevator element, structural columns, and an exterior skin. With reference to FIG. 5C, a third slice 502-3, a fourth slice 502-4, a fifth slice 502-5, and a sixth slice 502-6 are sequentially placed side-by-side. The slices each include four primary room elements, a hallway element, an administrative element, structural columns, and an exterior skin and are successively placed adjacently to the right sight of each proceeding slice. With reference to FIG. 5D, a seventh slice 502-7 is placed adjacently on the right-most part of the floor plan and includes a stairway element, a hallway element, an administrative area element, one primary room, structural columns, and an exterior skin. In an embodiment, the first and seventh slices 502-1, 502-7 are end cap slices reserved for the first and last slice of a floor plan and have three external walls. In another embodiment, as described above, each of the seven slices is pre-configured such that placement of the slices in any order will be possible without, for example, interrupting the hallway or isolating a primary room from an administrative area. In an embodiment, because each slice is pre-configured to allow for placement in any order, the building plan generator can quickly generate a building plan.

In addition to facilitating quick generation of building plans, using slices to generate a building plan allows for the building plan generator to vary the floor plan of a building plan to generate multiple building plans that satisfy the input parameters without having to consider a multitude of factors each time. For example, traditional development of a building plan involves placing building elements in the floor plan and then stacking the floor plan multiple times. Thus, in order to develop a building plan with sixty rooms, a floor plan with six primary rooms can be stacked ten times (e.g., tall building with short floors) or a floor plan with ten primary rooms can be stacked six times (e.g., short building with long floors). When developing the floor plan with six primary rooms, a multitude of factors, such as how the hallway connects to rooms or where elevator shafts are placed, are considered. Then, when developing the floor plan with ten primary rooms, the same multitude of factors will have to be reconsidered. Thus, each building plan requires a multitude of factors relating to building elements and input parameters to be reconsidered, which increases the time needed to develop or generate building plans.

Alternatively, a system that uses slices to generate a building plan can generate the building plan in a shortened time frame compared to traditional building plan generators because considerations, such as how the hallway connects to rooms or where elevator shafts are placed, need not be reconsidered each time a floor plan is generated. Considerations are not needed because the use of pre-configured slices provides assurance that the slices can be placed in any order and the resultant building plan will be functional. For example, a building plan generator that generates a floor plan with six primary rooms selects pre-configured slices that are sufficient to form a floor plan having six primary rooms. Then, when generating a floor plan that has ten primary rooms, the building generator can select the same slices plus any additional slices needed to form a floor plan having ten primary rooms. Thus, the two floor plans (e.g., the six room floor plan and the ten room floor plan) can be generated quickly because the building plan generator can generate both floor plans without reconsidering, for example, how the hallway will connect with rooms in the floor plan or how structural columns will interfere with room placement.

FIGS. 6A-6L illustrate several building plans 602-1-602-12 that are generated using slices. As illustrated, the building plans range from having more rooms per floor than total floors (e.g., building plan 602-1) to having more total floors than rooms per floor (e.g., building plan 602-12.) In order to generate each of the building plans, a different floor plan is generated by selecting more or fewer slices to form a floor plan and repeating the floor plan for each floor a number of times in order to generate each building plan. As illustrated, each building plan includes a total number of primary rooms as required by a user-generated or automatically-generated requirement and, therefore, each building plan is a viable building plan that could be constructed to satisfy the user-generated or automatically-generated requirements. In an embodiment, the minimum and maximum number of slices and/or primary rooms per floor can be set as an input parameter to limit the number of building plans generated by the building plan generator.

Figure 7A:
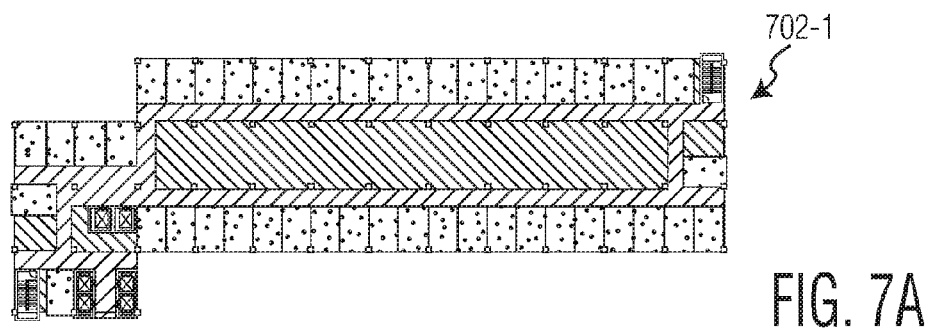
FIGS. 7A-7L illustrate several floor plans that are used to generate the building plans of FIGS. 6A-6L.
Figure 7B:
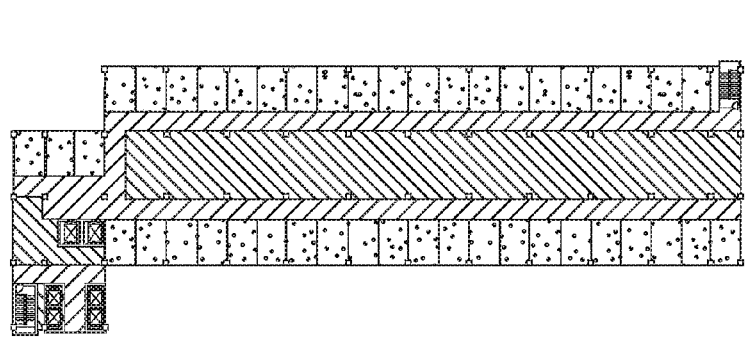
Figure 7C:
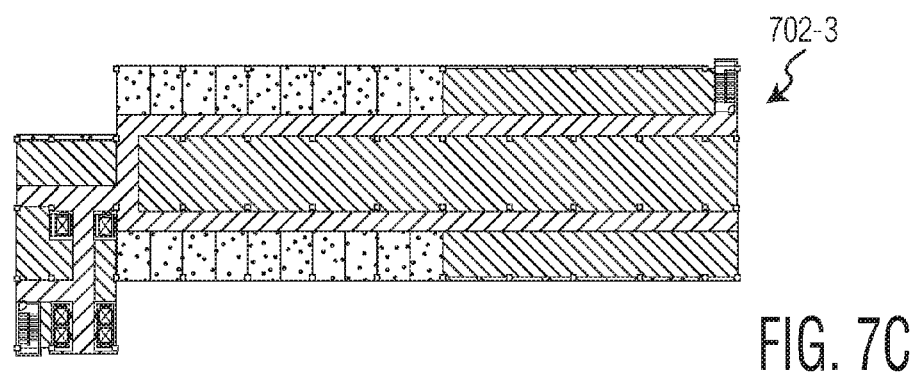
Figure 7D:
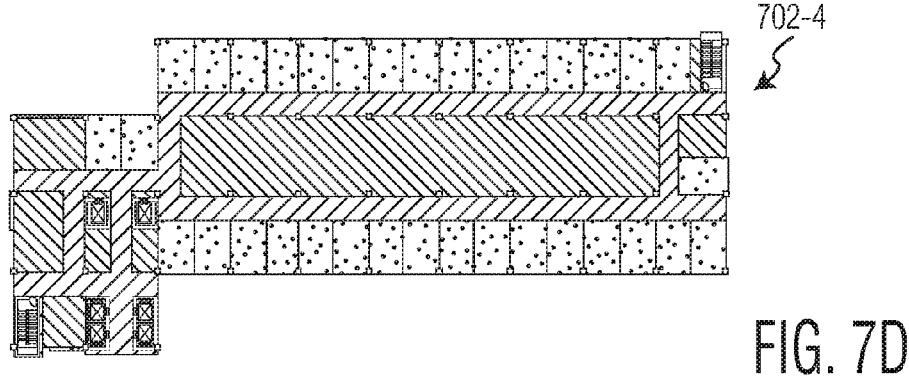
Figure 7E:
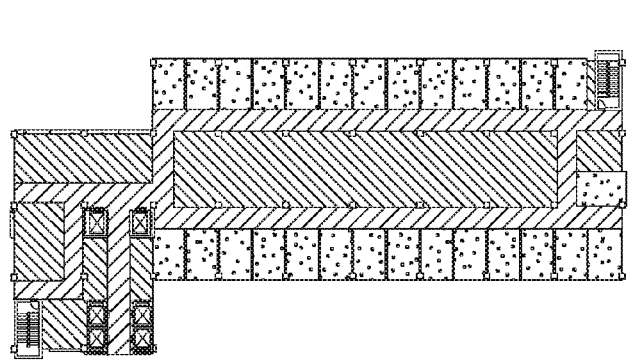
Figure 7F:
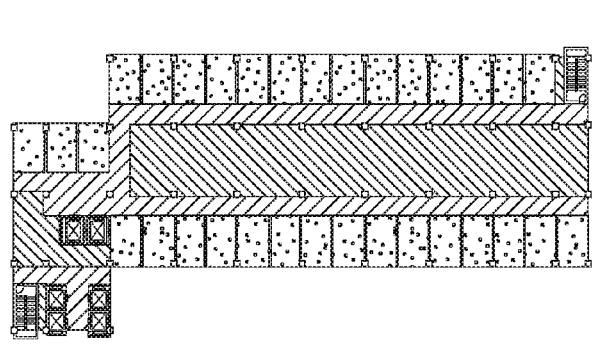
Figure 7G:
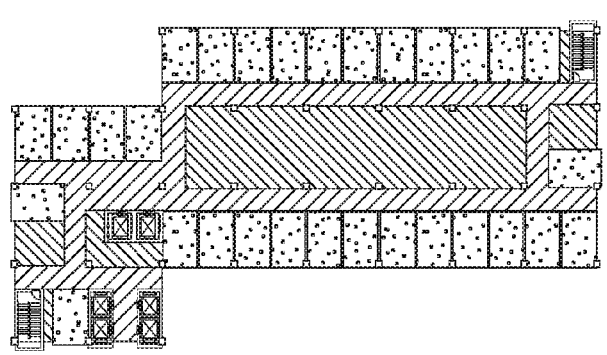
Figure 7H:
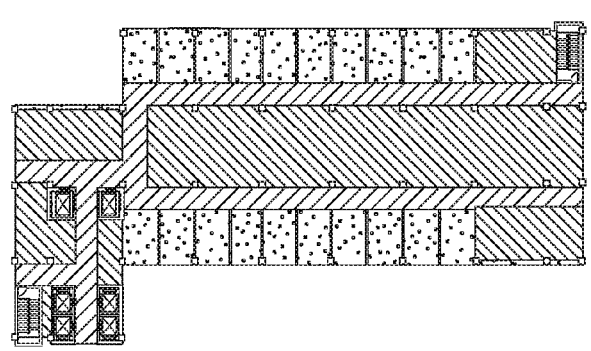
Figure 7I:
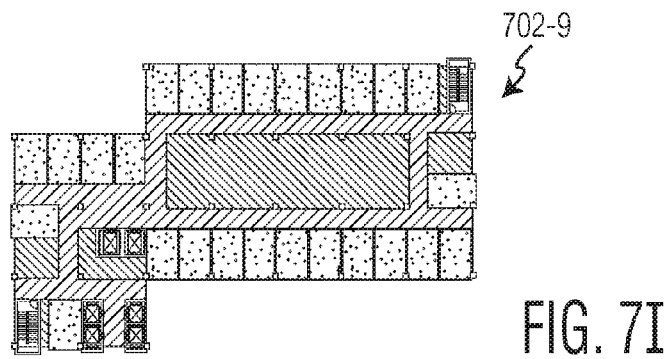
Figure 7J:
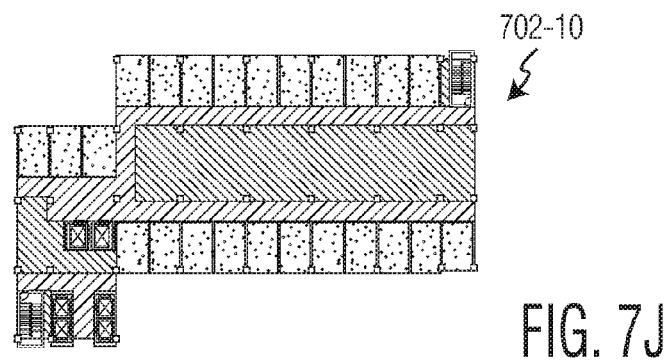
Figure 7K:
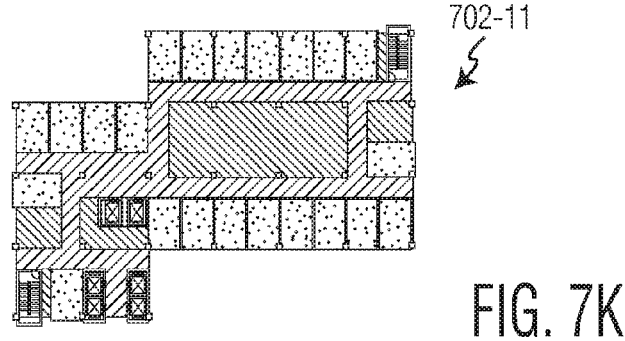
Figure 7L:
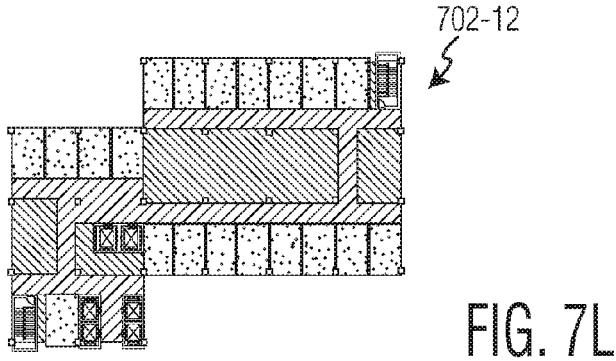

FIGS. 7A-7L illustrate several floor plans 702-1-702-12 that are used to generate the building plans of FIGS. 6A-6L. For example, a first floor plan 702-1 that corresponds to building plan 602-1 of FIG. 6A can be formed by selecting twelve slices and placing the slices side-by-side to form the floor plan. Alternatively, a second floor plan 702-12 that corresponds to building plan 602-12 of FIG. 6L can be formed by selecting six slices and placing the slices side-by-side to form the floor plan. Thus, the floor plan for each building plan can be quickly formed by placing a number of slices side-by-side to form a floor plan and repeating the floor plan a number of times until all input parameters are satisfied by the building plan. In an embodiment, the slices in each floor plan are placed according to a pre-defined pattern. In an embodiment, floor plans can be typical floor plans or atypical floor plans. In an embodiment, typical floor plans are floor plans in which primary rooms extend the full length of the floor plan. In FIGS. 7A-7L, floor plans 702-1, 702-2, 702-4-702-7, and 702-9-702-11 are examples of typical floor plans. In an embodiment, atypical floor plans are floor plans in which primary rooms only partially extend along the length of the floor plan. In FIGS. 7A and 7H, floor plans 702-3 and 702-8 are atypical floor plans. In an embodiment, space on an atypical floor that is not used for primary rooms can be used for other purposes (e.g., nurse stations or larger hallways) or a typical floor can be built with external dimensions that are smaller than the lower floors (e.g., a penthouse floor). In an embodiment, a typical floor plan is stacked and topped with an atypical floor plan in order to achieve a desired number of rooms when the desired number of rooms is not a multiple of the rooms per typical slice multiplied by the number of floors. For example, when using a floor plan with twenty primary rooms per floor, an atypical floor plan with only ten rooms will be needed to generate a building plan with 250 primary rooms because twenty does not divide evenly into 250. Building plan 602-3 is an example of a building plan that includes an atypical floor plan.

By using slices to generate configuration variants, the utilization of processing power of a building plan generator can be improved by reducing the processing demand on the building plan generator. The processing demand for generating configuration variants is reduced by selecting slices that satisfy input parameters from a library of pre-configured slices and placing the slices to generate variations of the building plan without reprocessing the building elements in the building plan for each variation. Thus, variations of building plans can be generated without placing a large processing demand on the building plan generator.

Figure 8A:
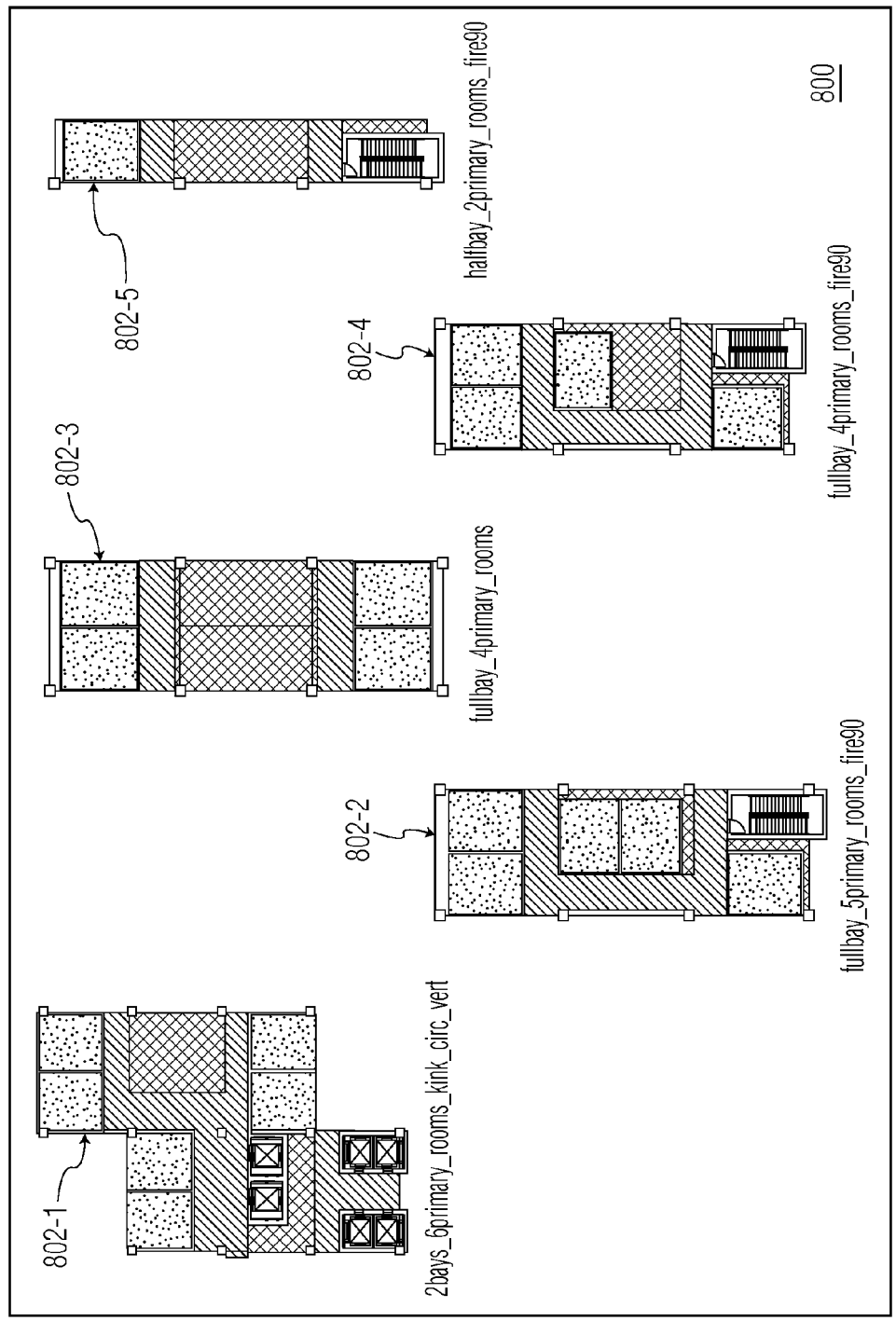
FIG. 8A is an example of a portion of a slices library.

FIG. 8A is an example of a portion of a slice library 800. In an embodiment, slices are categorized by a number of bays to which the width of the slice is equal. For example, a typical bay is thirty feet by thirty feet so a slice that is thirty feet by ninety feet would have a width equal to one bay and would be categorized as a single bay slice (also referred to as a "full bay" slice). In an embodiment, a bay is an illustrative representation of a space in a physical building and can be defined with a length of thirty feet and a width of thirty feet, but other dimensions can be used as well. In an embodiment, a slice that occupies the width of a single bay is referred to as a single bay or full bay slice, a slice that occupies the width of two bays (e.g., a slice with a width of sixty feet and a length of ninety feet) is referred to as a two bay slice, and a slice that covers half of a bay (e.g., a slice with a width of fifteen feet and a length of ninety feet) is referred to as a half bay slice. Thus, a two bay slice is twice as wide as a single bay slice and a single bay slice is twice as wide as a half bay slice. In the example of FIG. 8A, the slices library includes one two bay slice 802-1 (2bays_6primary_rooms_kink_circ_vert), three full bay slices 802-2-802-4 (fullbay_5primary_rooms_fire90, fullbay_4primary_rooms, and fullbay_4primary_rooms_fire90), and one half bay slice 802-5 (halfbay_2primary_rooms_fire90).

FIG. 8B is an example of pseudo-code 810 for generating a building plan using slices in the slices library. According to the pseudo-code, whether a floor plan is typical or atypical is indicated and two fixed slices (e.g., slices required to generate a floor plan using a particular floor plan template) are placed within the floor plan. The second slice is vertically offset from the first slice in order to establish a kink in the floor plan shape. Next, three full slices (in accordance with a quantity set by a user or other software) are placed within the floor plan. The floor plan is then capped by a slice that is placed adjacent to the last of the three full slices. In the example of FIG. 8B, the floor plan is capped by one half bay slice. Once slices are finished being placed in the floor plan, the floor plan is stacked to complete the generation of a building plan. In an embodiment, stacking involves graphically aligning instances of a floor plan to generate a building plan having multiple floors. In the example of FIG. 8B, the pseudo-code stacks five instances of the generated floor plan to generate a building plan with 120 rooms.

Figure 9:
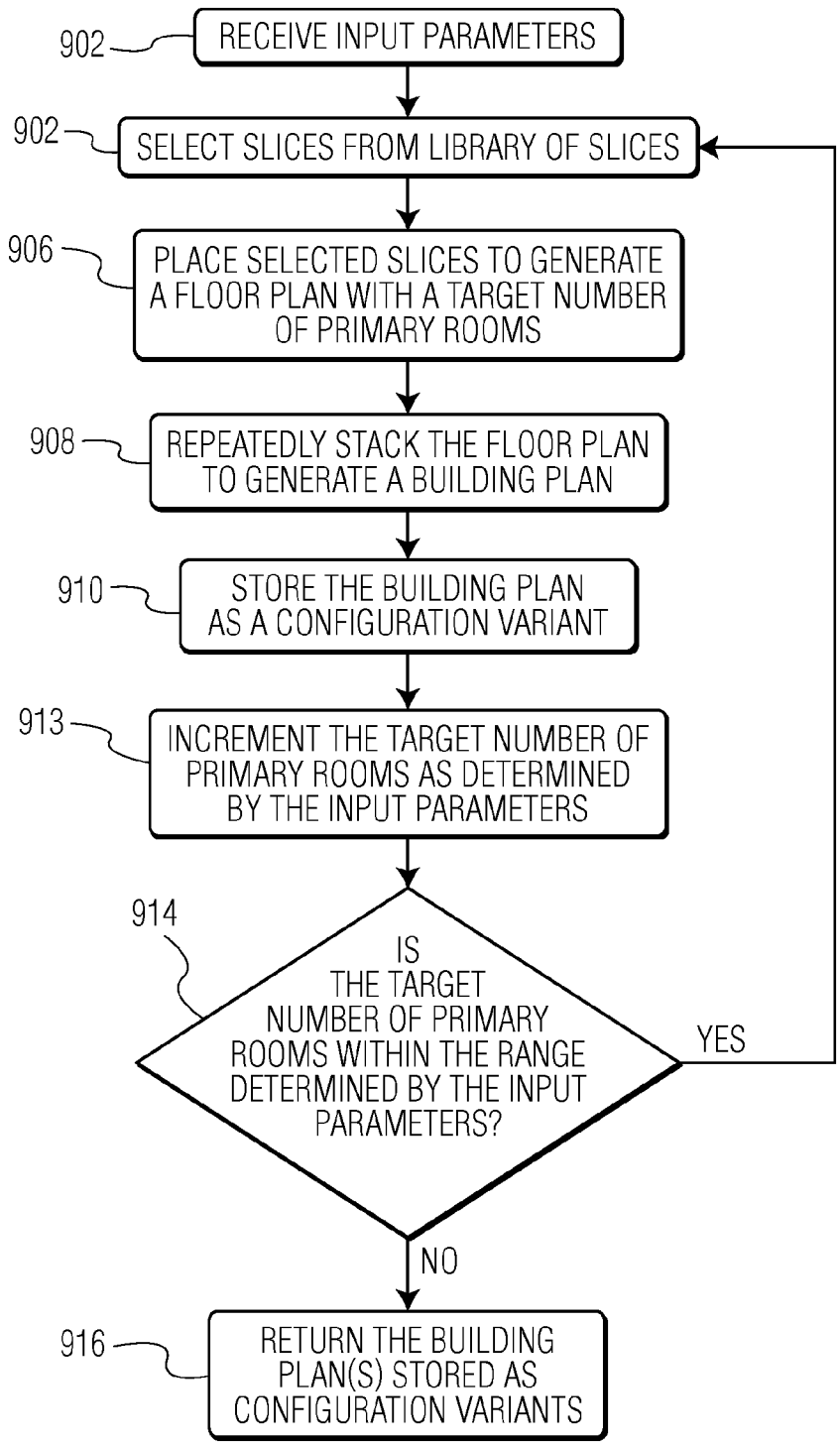
FIG. 9 is a flowchart diagram of a method for generating a building plan using slices in accordance with an embodiment of the invention.

FIG. 9 is a flowchart diagram of a method for generating a building plan using slices in accordance with an embodiment of the invention. At block 902, input parameters are received. In an embodiment, input parameters include a target number of primary rooms in the building, a minimum number of primary rooms per floor, a maximum number of primary rooms per floor, and a step size by which the number of primary rooms should be incremented each time a floor plan is generated. At block 904, slices are selected from a library of slices. In an embodiment, the slices are selected in order to satisfy the input parameters. For example, if an input parameter specifies that a building plan should have one hundred rooms starting with a minimum of twenty rooms per floor, then, on a first pass, slices with rooms that will form a floor with a target number of twenty rooms will be selected, but then, on a second pass, the target number may be increased (in accordance with the input parameters) and slices with rooms that will form a floor with an increased number of rooms will be selected. At block 906, the selected slices are placed to generate a floor plan with the target number of primary rooms. For example, on a first pass when the target number of rooms is twenty rooms, a floor plan with twenty rooms will be generated, but then, on a second pass when the target number of rooms is twenty two rooms, a floor plan with twenty two rooms will be generated. At block 908, the generated floor plan is repeatedly stacked to generate a building plan. For example, if an input parameter specifies that a building plan should have one hundred rooms and a floor plan with twenty rooms is generated at block 906, then the floor plan is repeatedly stacked five times to generate a building plan with one hundred rooms. At block 910, the generated building plan is stored as a configuration variant. In an embodiment, the configuration variant is stored in configuration variants storage (as described with reference to FIG. 11 below). At block 912, the target number of primary rooms in incremented. For example, if the target number of primary rooms per floor is twenty and a step size of two has been specified by the input parameters, then the target number of primary rooms per floor will be increased to twenty two primary rooms per floor. At decision point 914, it is determined whether the target number of primary rooms exceeds a maximum number of primary rooms per floor as determined by the input parameters. For example, if the input parameters determine that no more than forty primary rooms should be on a single floor, then a target number of primary rooms in excess of forty would be determined to exceed a maximum number of primary rooms per floor. If the target number of primary rooms does not exceed a maximum number of primary rooms per floor, then the process returns to block 904. If the target number of primary rooms does exceed a maximum number of primary rooms per floor, then, at block 916, the stored building plan or plans are returned. In an embodiment, the building plan or plans are stored in configuration variants storage and are returned to a user that configured the input parameters. In an embodiment, the building plan or plans are returned to the user as graphical illustrations in an arrangement similar to FIG. 6. In an embodiment, the arrangement further comprises a floor pattern selector for selecting, for example, a bar floor plan, a bar with a kink at an end floor plan, or a bar with a kink at the middle floor plan. In an embodiment, if a building plan is generated with a number of primary rooms outside of an acceptable range defined by the minimum and maximum number of primary rooms on a floor, then the building plan is not stored and not returned to the user.

Figure 10:
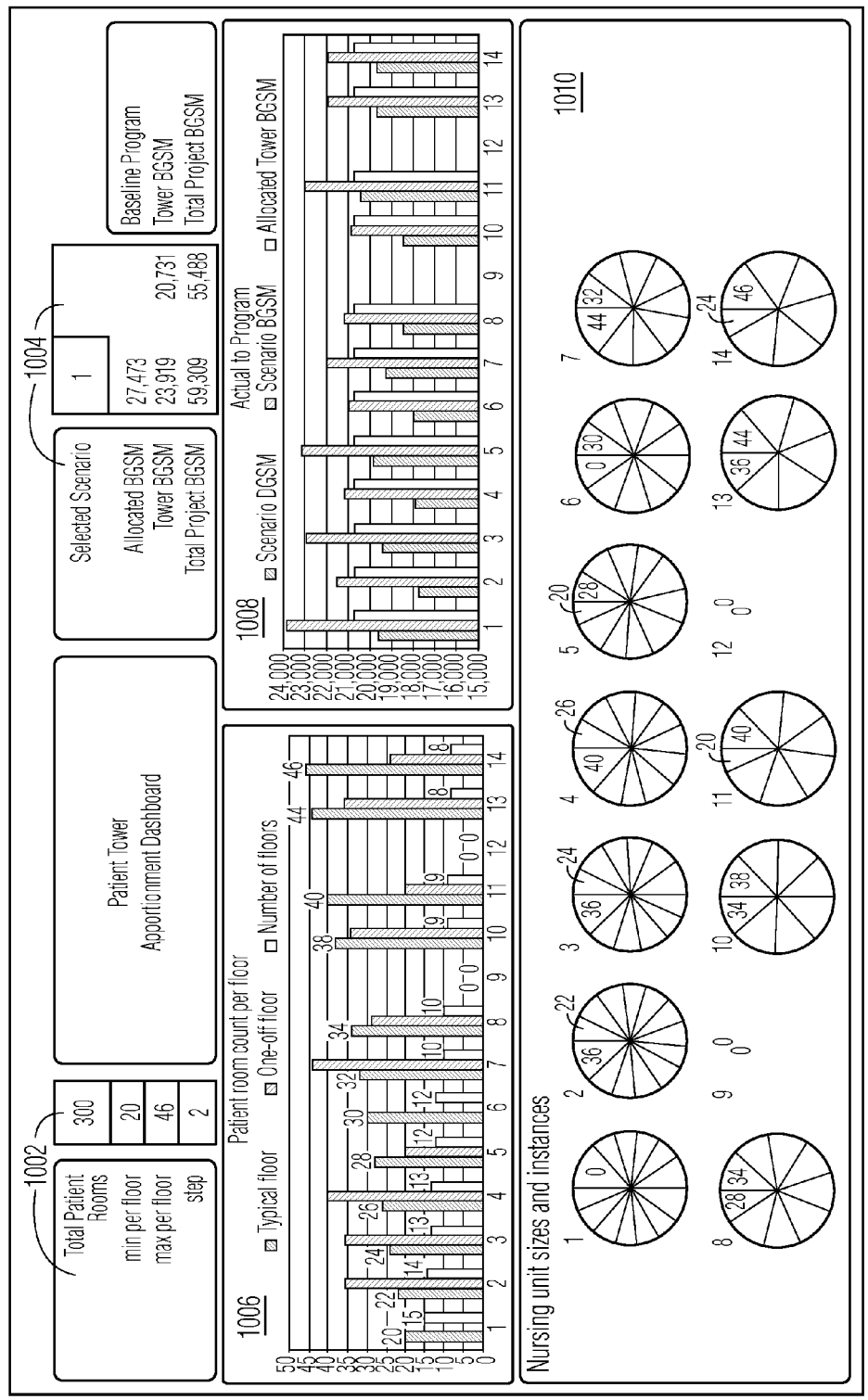
FIG. 10 is an illustration of a user interface for configuring a building plan generator and for viewing information generated from the building plan generation process.

FIG. 10 is an illustration of a user interface for configuring a building plan generator and for viewing information generated from the building plan generation process. The user interface is displayed on a display device and includes a generation parameters box 1002, a selected generation parameters box 1004, a graphical indication 1006 of primary rooms per floor, a graphical indication 1008 of departmental gross square footage (DGSF), simulated building gross square footage (BGSF), and actual BGSF, and a graphical indication 1010 of nursing unit sizes and instances. In an embodiment, the generation parameters box displays inputs received directly from a user (e.g., total number of primary rooms desired in a building plan, min & max primary rooms per floor, and the step size), the selected generation parameters box, indicates which generation scenario is currently selected (e.g., where in the range of minimum primary rooms to maximum primary rooms per floor the generation falls), and the graphical indications indicate information regarding the selected generation as indicated by the labeling.

Figure 11:
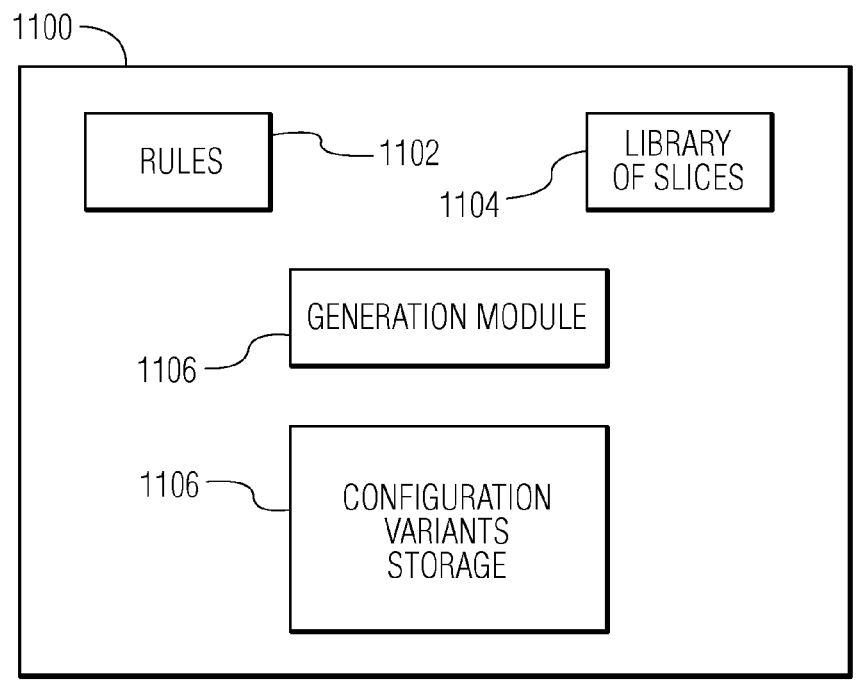
FIG. 11 is a functional diagram of a system for generating a building plan.

FIG. 11 is a functional diagram of a system 1100 for generating a building plan (referred to herein as a building plan generator that uses the above described technique). The building plan generator includes rules 1102, a library of slices 1104, a generation module 1106, and configuration variants storage 1108. In an embodiment, rules are user-defined and received by the building plan generator through a user interface (such as the user interface described with reference to FIG. 10). The library of slices includes parametric cross-sectional units of a floor plan that can be connected along connection edges to form a full floor plan. In an embodiment, the slices are pre-configured by a user or further automation before the building plan generator runs. In an embodiment, the rules may require that slices be placed side-to-side from left to right at pre-defined intervals, require that exterior edges of slices do not touch connection edges of slices, require that any used vertical circulation pathways align and are positioned at the ends of each floor (unless the ends of the floor are greater than a user-defined distance apart and then an additional vertical circulation pathway can be added between the ends of the floor), and require that connection edges touch other connection edges such that horizontal circulation pathways align between slices. In an embodiment, the generation module receives parameters from a user and selects slices from the library of slices and places the selected slices side-by-side in a sequential manner (e.g., left-to-right or right-to-left) to generate configuration variants in accordance with the rules. In an embodiment, the configuration storage can be a local database or a remote database storing code for rendering the pre-configured slices or storing rendered representations of pre-configured slices. In an embodiment, when a configuration variant is generated by the generation module, the variant is stored in the configuration variants storage. In an embodiment, the building plan generator is implemented, at least in part, in software.

Figure 12:
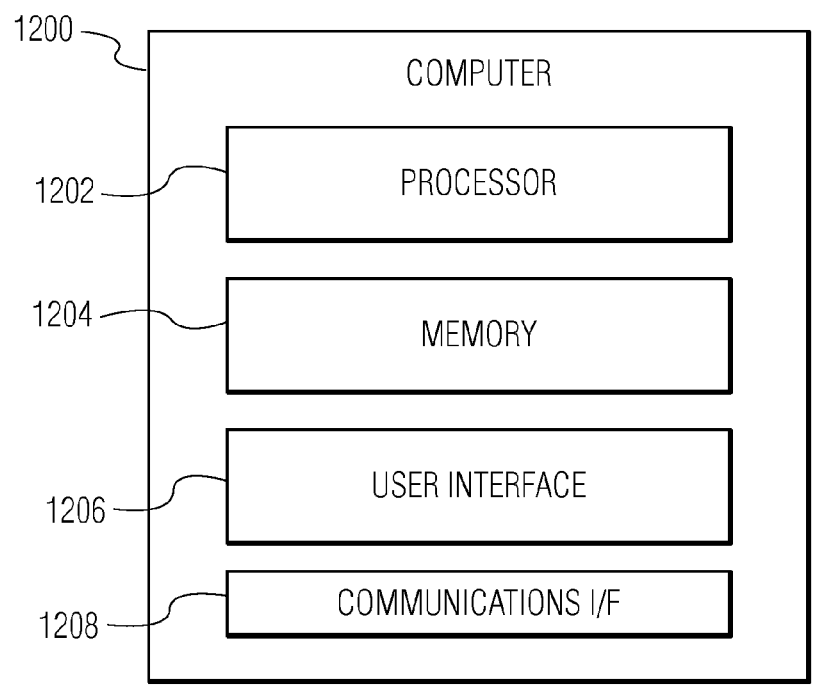
FIG. 12 is a block diagram of computer in which the building plan generator can run.

FIG. 12 is a block diagram of computer 1200 in which the building plan generator can run. In an embodiment, the computer includes a processor 1202, memory 1204, a user interface 1206, and a communications interface 1208. In an embodiment the processor executes instructions stored in the memory and, when the instruction are executed, the above-described techniques are performed. In an embodiment, the user interface facilitates the interaction between a user and the building plan generator. For example, the interface can be the interface described with reference to FIG. 10. In an embodiment the user interface is a browser-based interface accessible to a user via interface devices with browser capability. In an embodiment, the communications interface can be a standard I/O bus for communication with a keyboard and mouse or the communications interface can be a network interface card (NIC) configured to receive input over standard TCP/IP.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the above-described methods and systems may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A non-transitory computer-readable storage medium comprising instructions that, when executed by a computer, cause the computer to perform steps for generating a building plan comprising:
   receiving parameters;
   selecting pre-configured slices from a library of slices that satisfy the parameters; and
   placing the selected slices to generate a configuration variant in accordance with slice placement logic;
   wherein slices in the library of slices are each defined with connection edges on opposite sides of the slice along which each other slice in the library of slices can be placed; and
   wherein each slice in the library of slices includes a horizontal circulation pathway that bisects the slice from one connection edge to an opposite connection edge.

2. The non-transitory computer-readable storage medium of claim 1, wherein the instructions further cause the computer to repeatedly select and place slices in alternative configurations to generate a plurality of configuration variants.

3. The non-transitory computer-readable storage medium of claim 1, wherein the parameters received include at least one of a target number of rooms in a building, a minimum number of rooms per floor, a maximum number of rooms per floor, and a step size by which the number of primary rooms per floor can be increased.

4. The non-transitory computer-readable storage medium of claim 1, wherein each slice is a pre-configured parametrically-defined rectangular cross-section of a floor plan and comprises:
   a structural grid that defines the location of structural columns within a slice;
   external edges that form the outside walls of a building; and
   an indicator of a circulation element.

5. The non-transitory computer-readable storage medium of claim 4, wherein each slice further comprises at least one of:
   an indicator of a primary room; and
   indicators of space types.

6. The non-transitory computer-readable storage medium of claim 1, wherein placing the selected slices comprises:
   selecting a first selected slice and placing the first selected slice in the slice placement pattern;
   selecting a second selected slice and placing the second selected slice in the slice placement pattern such that a connection edge of the first selected slice and a connection edge of the second selected slice abut one another; and
   repeatedly placing slices from the selected slices in the slice placement pattern until the slice placement pattern is completed.

7. A method for generating a building plan, the method comprising:
   receiving parameters;
   selecting pre-configured slices from a library of slices that satisfy the parameters; and
   placing the selected slices to generate a configuration variant in accordance with slice placement logic;
   wherein slices in the library of slices are each defined with connection edges on opposite sides of the slice along which each other slice in the library of slices can be placed; and
   wherein each slice in the library of slices includes a horizontal circulation pathway that bisects the slice from one connection edge to an opposite connection edge.

8. The method of claim 7, wherein the method further comprises repeatedly selecting and placing slices in alternative configurations to generate a plurality of configuration variants.

9. The method of claim 7, wherein receiving parameters involves receiving at least one of a slice placement pattern, a target number of primary rooms in the building, a minimum number of primary rooms per floor, a maximum number of primary rooms per floor, and a step size by which the number of primary rooms per floor can be increased.

10. The method of claim 7, wherein each slice is a pre-configured parametrically-defined rectangular cross-section of a floor plan and comprises:
    a structural grid that defines the location of structural columns within a slice;
    external edges that form the outside walls of a building; and
    an indicator of a circulation element.

11. The method of claim 7, wherein placing the selected slices comprises:
    selecting a first selected slice and placing the first selected slice in the slice placement pattern;
    selecting a second selected slice and placing the second selected slice in the slice placement pattern such that a connection edge of the first selected slice and a connection edge of the second selected slice abut one another; and
    repeatedly placing slices from the selected slices in the slice placement pattern until the slice placement pattern is completed.

12. The method of claim 7, wherein a slice in the library of slices can be placed adjacent to all slices in the library of slices.

13. The method of claim 7, wherein placing a first selected slice adjacent to a second selected slice causes the structural grid, exterior skin, and circulation grid of the first selected slice to connect with the structural grid, exterior skin, and circulation grid of the second selected slice respectively.

14. A system for generating a building plan, the system comprising:
    a rules module including slice placement logic;
    a library of slices including pre-configured slices;
    a generation module configured to:
        receive parameters;
        select pre-configured slices that satisfy the parameters from the library of slices; and
        place the selected pre-configured slices to generate a configuration variant in accordance with the slice placement logic; and
    storage for the generated configuration variants;
    wherein slices in the library of slices are each defined with connection edges on opposite sides of the slice along which each other slice in the library of slices can be placed; and
    wherein each slice in the library of slices includes a horizontal circulation pathway that bisects the slice from one connection edge to an opposite connection edge.

15. The system of claim 14, wherein the generation module is further configured to repeatedly select and place slices in alternative configuration to generate additional configuration variants.

16. The system of claim 14, wherein the parameters received include at least one of a target number of primary rooms in a building, a minimum number of primary rooms per floor, a maximum number of primary rooms per floor, and a step size by which the number of primary rooms per floor can be increased.

17. The system of claim 14, wherein each slice is a pre-configured parametrically-defined rectangular cross-section of a floor plan and comprises:
    a structural grid that defines the location of structural columns within a slice;
    external edges that form the outside walls of a building; and
    an indicator of a circulation element.

18. The system of claim 17, wherein each slice further comprises at least one of:
    an indicator of a primary room; and
    indicators of space types.

19. The system of claim 14, wherein placing the selected slices comprises:
    selecting a first selected slice and placing the first selected slice in the slice placement pattern;
    selecting a second selected slice and placing the second selected slice in the slice placement pattern such that a connection edge of the first selected slice and a connection edge of the second selected slice abut one another; and
    repeatedly placing slices from the selected slices in the slice placement pattern until the slice placement pattern is completed.

* * * * *